United States Patent
Hayashi

(10) Patent No.: US 12,485,755 B2
(45) Date of Patent: Dec. 2, 2025

(54) DISPLAY CONTROL DEVICE, DISPLAY SYSTEM, AND DISPLAY CONTROL METHOD

(71) Applicant: Nippon Seiki Co., Ltd., Niigata (JP)

(72) Inventor: Takeru Hayashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 21 days.

(21) Appl. No.: 18/832,187

(22) PCT Filed: Jan. 27, 2023

(86) PCT No.: PCT/JP2023/002571
§ 371 (c)(1),
(2) Date: Jul. 23, 2024

(87) PCT Pub. No.: WO2023/145852
PCT Pub. Date: Aug. 3, 2023

(65) Prior Publication Data
US 2025/0135885 A1    May 1, 2025

(30) Foreign Application Priority Data

Jan. 31, 2022  (JP) .................................. 2022013226
May 26, 2022  (JP) .................................. 2022085657

(51) Int. Cl.
*B60K 35/29* (2024.01)
*B60K 35/10* (2024.01)
(Continued)

(52) U.S. Cl.
CPC .............. *B60K 35/28* (2024.01); *B60K 35/10* (2024.01); *B60K 35/21* (2024.01); *B60K 35/22* (2024.01);
(Continued)

(58) Field of Classification Search
CPC ...... B60K 35/28; B60K 35/81; B60K 35/233; B60K 35/29; B60K 35/10; B60K 35/235;
(Continued)

(56) References Cited

U.S. PATENT DOCUMENTS 5,742,924 A *  4/1998  Nakayama ......... G01C 21/3635
340/995.14
10,282,915 B1 *  5/2019  Lin ........................ G02B 27/01
(Continued)

FOREIGN PATENT DOCUMENTS

JP  2015-120395 A   7/2015
JP  2017-206251 A  11/2017
(Continued)

OTHER PUBLICATIONS

International Search Report dated Apr. 11, 2023 issued in International Patent Application No. PCT/JP2023/002571, with English translation.

*Primary Examiner* — Chico A Foxx
(74) *Attorney, Agent, or Firm* — Rimon P.C.

(57) ABSTRACT

The present invention provides a display in which it is easy to ascertain a planned travel path. This display control device displays, in a first display region, a real-view-following navigation image that follows a specific superimposition target in a real view so as to maintain the positional relation with the specific superimposition target. When it is inferred that visibility in a forward view from a vehicle will be impaired, the display control device displays, in a second display region that has a vertical center which is disposed lower than the vertical center of the first display region, a bird's-eye-view navigation image which includes, in a diagonal view from above, at least a map image that is of the (Continued)

surrounding area of the vehicle and a path image that overlaps with the map image and that indicates a planned travel path.

16 Claims, 7 Drawing Sheets

(51) Int. Cl.
*B60K 35/21* (2024.01)
*B60K 35/22* (2024.01)
*B60K 35/233* (2024.01)
*B60K 35/235* (2024.01)
*B60K 35/28* (2024.01)
*B60K 35/60* (2024.01)
*B60K 35/81* (2024.01)
*B60K 35/90* (2024.01)
*B60K 37/00* (2006.01)

(52) U.S. Cl.
CPC .......... *B60K 35/233* (2024.01); *B60K 35/235* (2024.01); *B60K 35/29* (2024.01); *B60K 35/60* (2024.01); *B60K 35/81* (2024.01); *B60K 35/90* (2024.01); *B60K 37/00* (2013.01); *B60K 2360/166* (2024.01); *B60K 2360/171* (2024.01); *B60K 2360/179* (2024.01); *B60K 2360/31* (2024.01)

(58) Field of Classification Search
CPC ........ B60K 35/60; B60K 35/22; B60K 35/21; B60K 35/90; B60K 37/00; B60K 2360/171; B60K 2360/166; B60K 2360/31; B60K 2360/179
See application file for complete search history.

(56) References Cited

U.S. PATENT DOCUMENTS

| | | | |
|---|---|---|---|
| 11,370,304 B2 | 6/2022 | Masuya et al. | |
| 11,599,113 B2* | 3/2023 | Shashua | G01C 21/32 |
| 11,650,708 B2* | 5/2023 | Filip | G01C 21/367 |
| | | | 715/861 |
| 11,842,447 B2* | 12/2023 | Son | G06V 10/82 |
| 11,869,162 B2* | 1/2024 | Lee | B60K 35/211 |
| 2008/0195315 A1* | 8/2008 | Hu | G08G 1/0969 |
| | | | 701/455 |
| 2011/0001819 A1* | 1/2011 | Asari | G01C 21/3647 |
| | | | 348/113 |
| 2022/0084458 A1 | 3/2022 | Sakuma et al. | |

FOREIGN PATENT DOCUMENTS

| | | |
|---|---|---|
| JP | 2020-196295 A | 12/2020 |
| WO | 2020/009219 A1 | 1/2020 |

\* cited by examiner

[FIG.1]
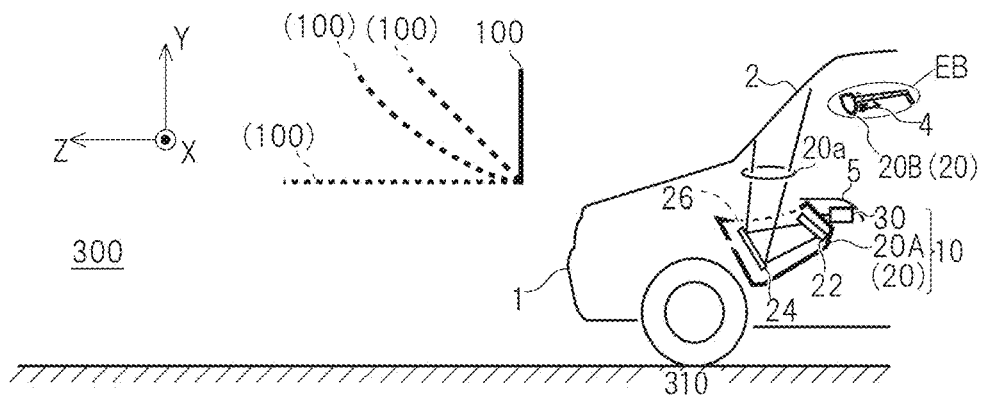
[FIG.2]
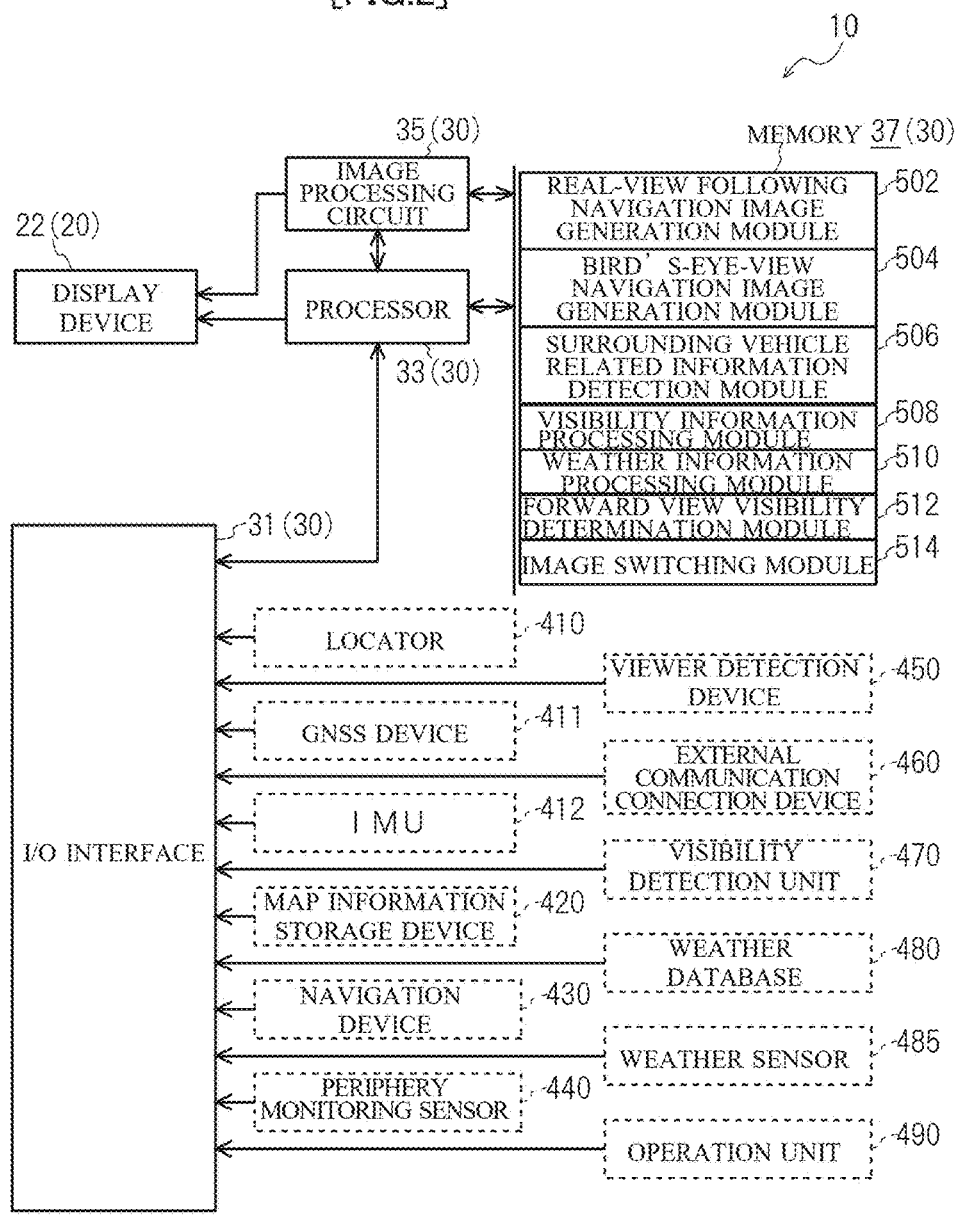

[FIG.3]
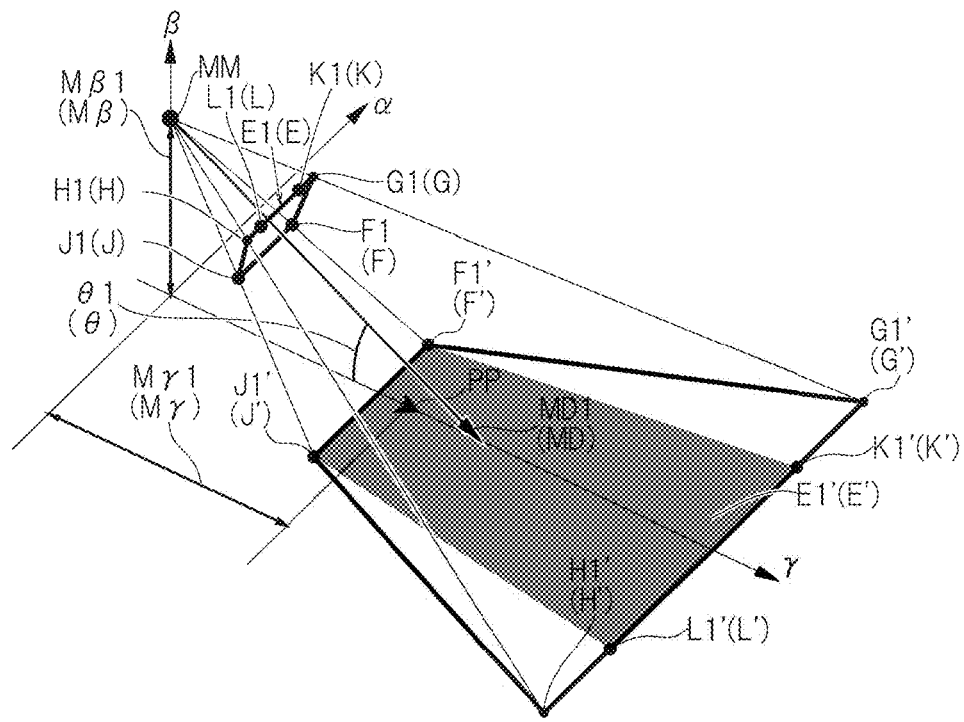
[FIG.4]
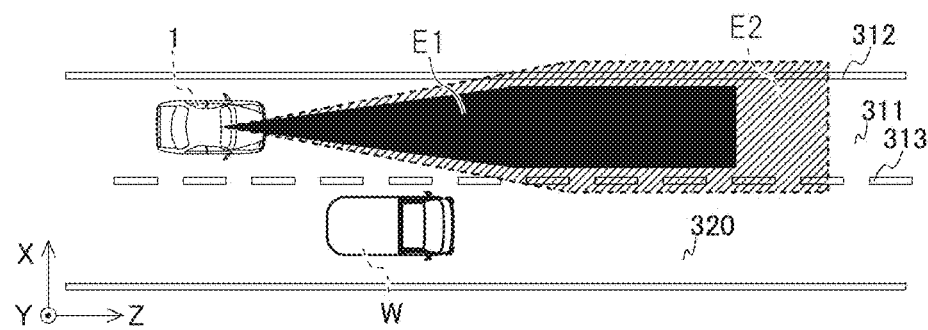
[FIG.5]
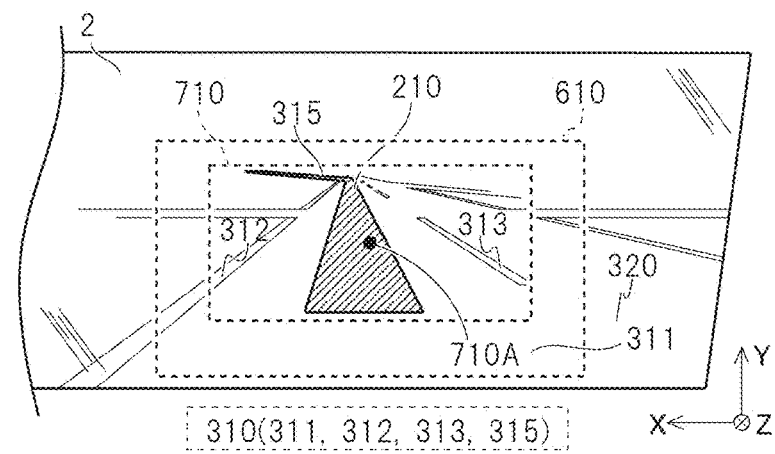

[FIG.6A]
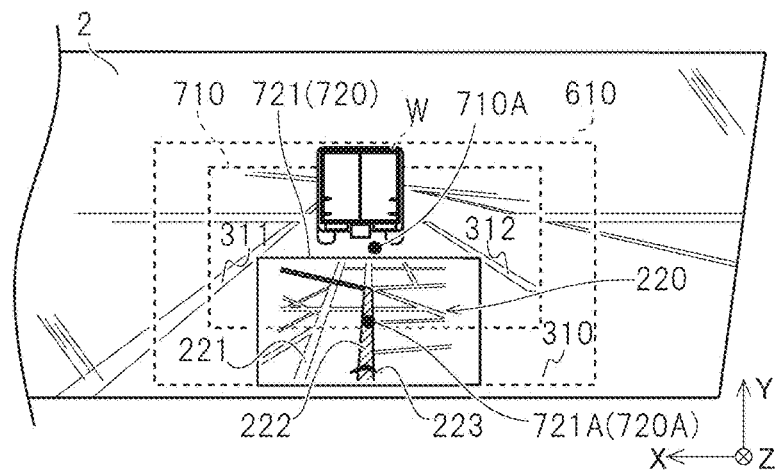
[FIG.6B]
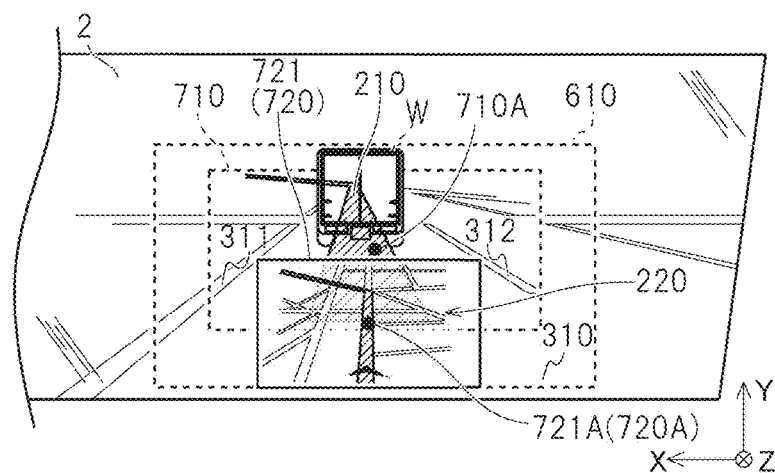
[FIG.7]
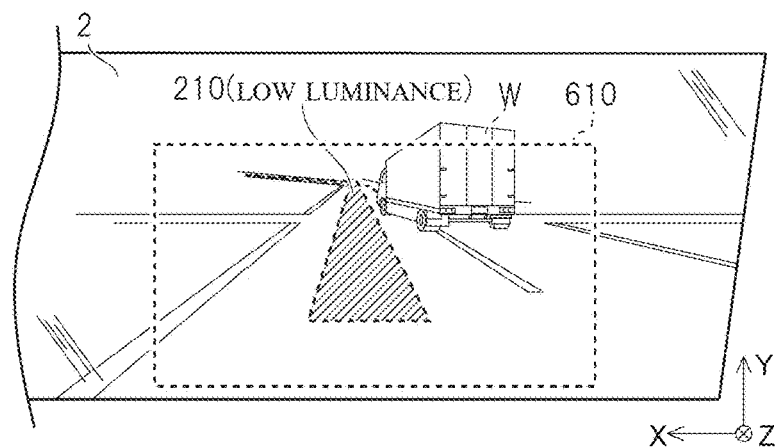

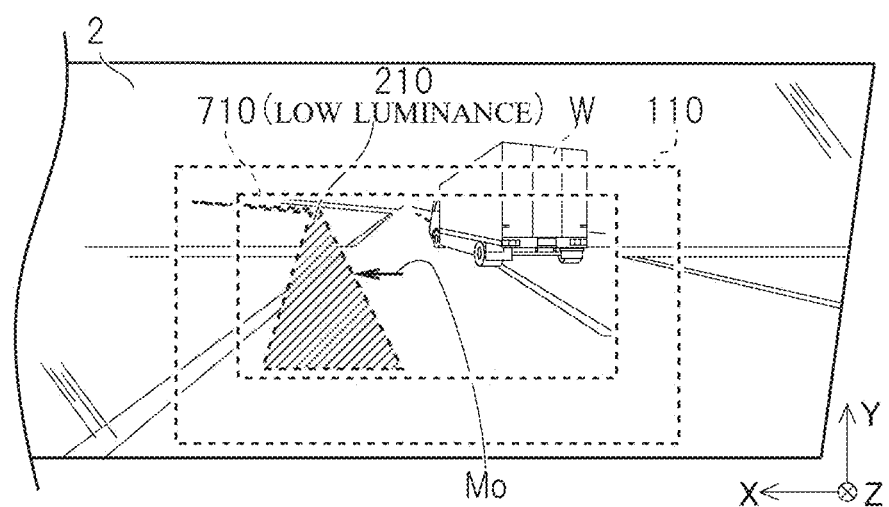
[FIG.8]

[FIG.9]
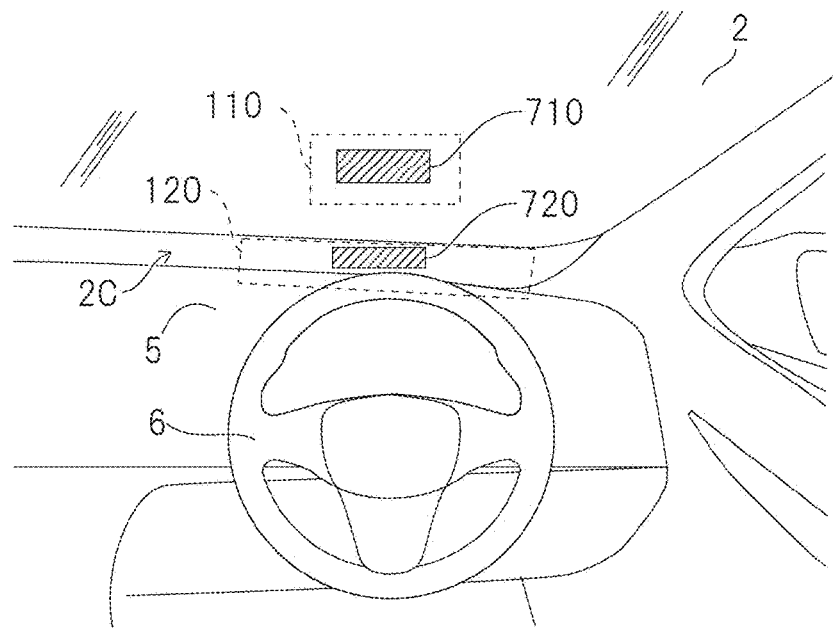
[FIG.10]
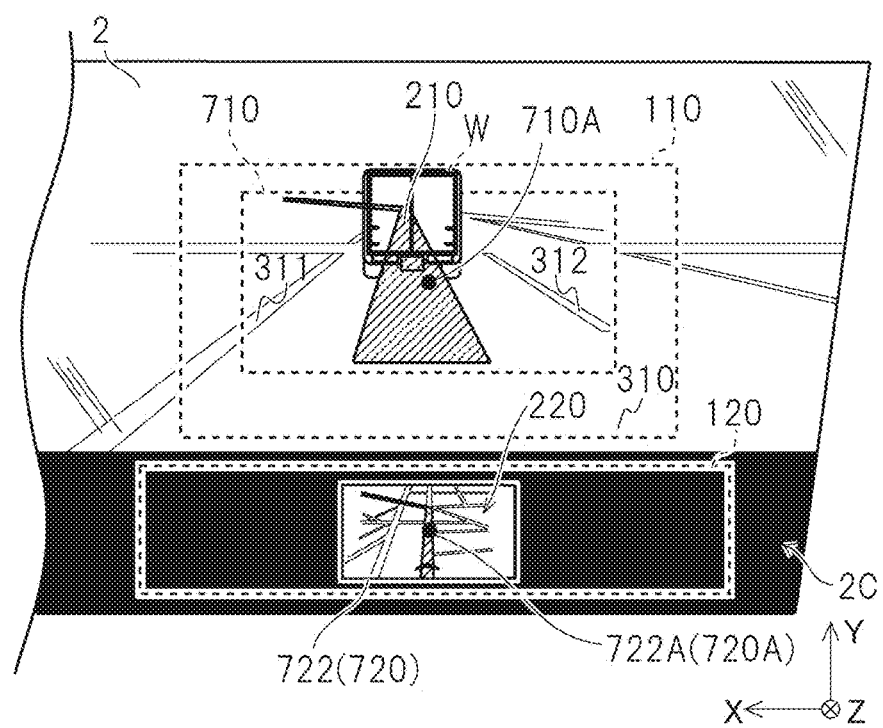

[FIG.11A]
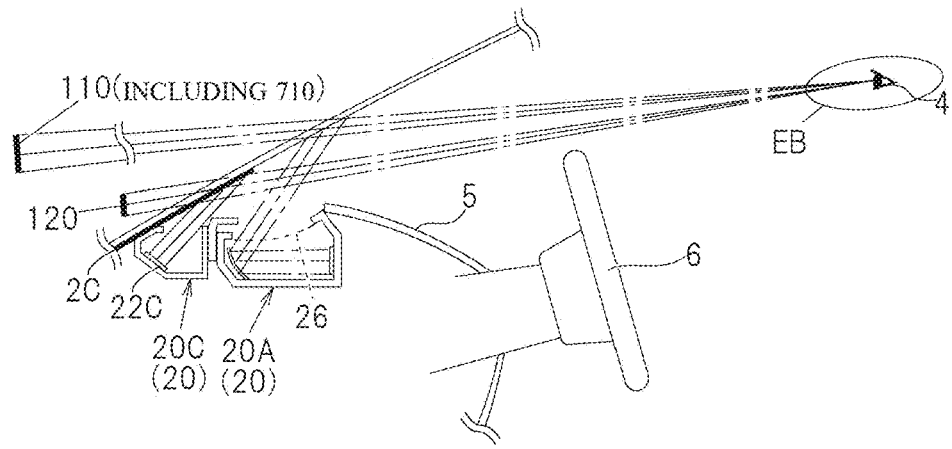
[FIG.11B]
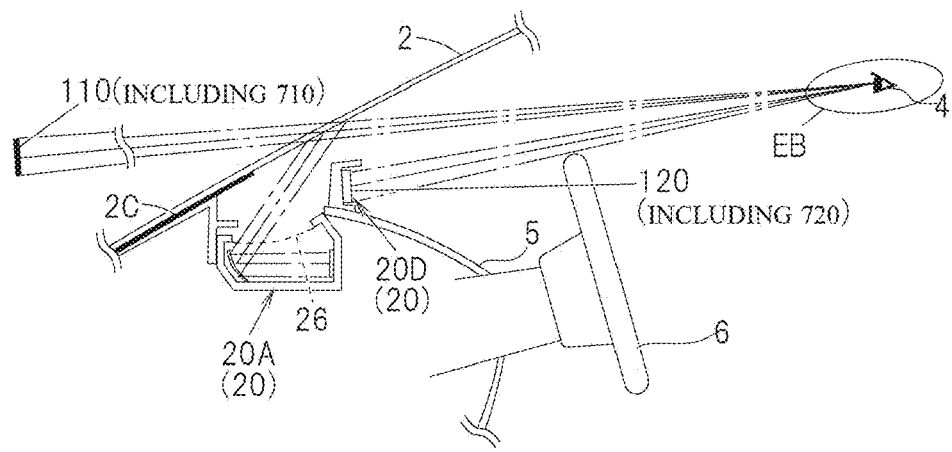
[FIG.11C]
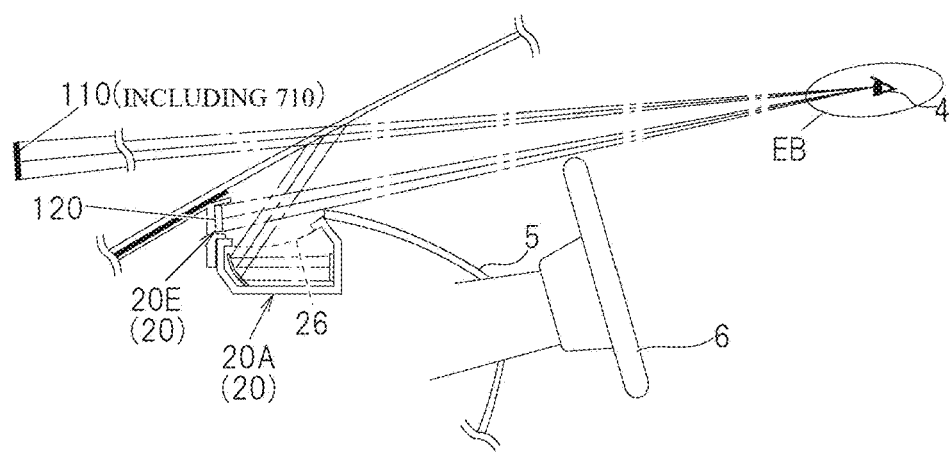

[FIG.12]
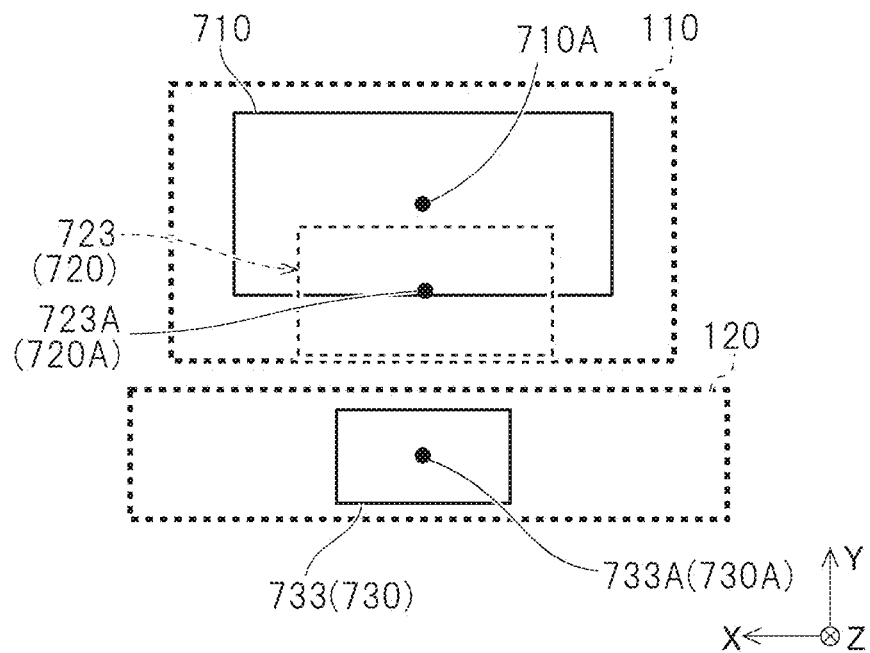
[FIG.13]
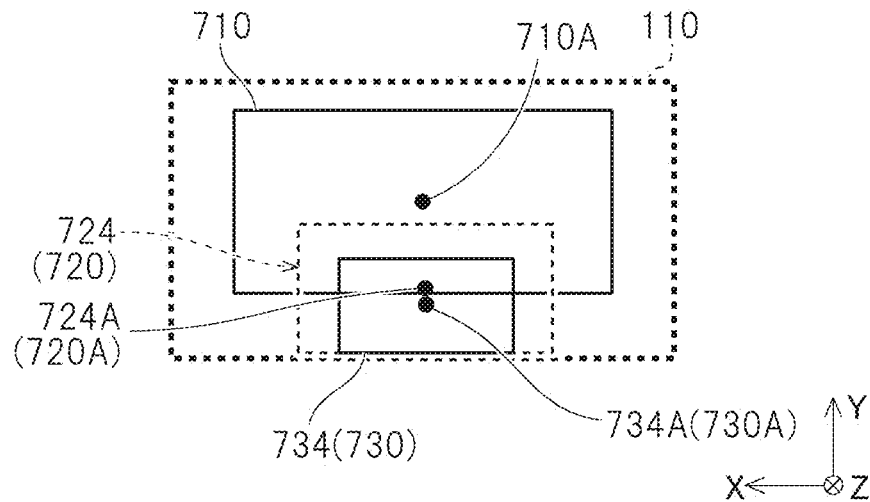

DISPLAY CONTROL DEVICE, DISPLAY SYSTEM, AND DISPLAY CONTROL METHOD

CROSS-REFERENCE OF RELATED APPLICATIONS

This application is the U.S. National Phase under 35 U.S.C. § 371 of International Patent Application No. PCT/JP2023/002571, filed on Jan. 27, 2023, which in turn claims the benefit of Japanese Patent Application Nos. 2022-013226, filed on Jan. 31, 2022, and 2022-085657, filed on May 26, 2022, and the entire disclosures of which Applications are incorporated by reference herein.

TECHNICAL FIELD

The present disclosure relates to a display control device, a display system, and a display control method, that are used in a vehicle and cause an image to be superimposed on a forward view from the vehicle and visually recognized.

BACKGROUND ART

A head-up display (HUD) device displays an image (virtual object) superimposed on a view in front of an own vehicle to express augmented reality (AR) in which information or the like is added to or emphasized on a real view or a superimposition target present in the real view, and accurately provides desired information while suppressing movement of the line of sight of a user driving the vehicle as much as possible, thereby contributing to safe and comfortable vehicle operation.

In particular, the head-up display device described in Patent Document 1 displays a plurality of image elements (virtual objects) that are disposed along a road surface and guide a planned driving route expressed in perspective with different senses of distance, thereby harmonizing an image (virtual object) and a real view (a predetermined position on the road surface with respect to the vehicle) to convey the route to an observer in an easy-to-understand manner.

PRIOR ART DOCUMENT

Patent Document

Patent Document 1: WO 2020/009219

SUMMARY OF THE INVENTION

Problems to be Solved by the Invention

When the virtual object (image) is displayed so as to correspond to the position of the real view (superimposition target) in the real world, for example, in a case where there is an other vehicle in front, the virtual object is continuously visually recognized by the observer, but the real view (superimposition target) hidden by the other vehicle is not visually recognized by the observer. It is assumed that it is difficult to intuitively grasp the route only by the virtual object that guides the planned driving route by being visually recognized together with the real view. Therefore, there is room for improvement in providing an easy-to-understand display to an occupant.

Solution to Problem

The summary of specific embodiments disclosed herein is provided below. It should be understood that these aspects are presented merely to provide the reader with the brief summary of these specific embodiments and that these aspects are not intended to limit the scope of the present disclosure. Indeed, the present disclosure may include various aspects that are not set forth below.

An overview of the present disclosure relates to providing an easy-to-understand display for an occupant. More specifically, the present disclosure also relates to providing a display that makes it easy to grasp a planned driving route.

Accordingly, in a first embodiment described herein, in the display control device that controls one or more image display units that display an image illustrating a planned driving route, one or more processors are included, and the one or more processors acquire navigation information related to the planned driving route, display, in a first display area, with a use of at least the navigation information, a real-view following navigation image that follows a specific superimposition target in a real view so as to maintain a positional relation with the specific superimposition target, acquire, as forward visibility information, at least one of other vehicle information related to a position of an other vehicle, visibility information related to a distance that can be seen ahead, and weather information, and display, in a second display area having a vertical center disposed below a vertical center of the first display area, a bird's-eye-view navigation image that includes, in a diagonal view from above, at least a map image of surroundings of an own vehicle and a route image overlapping with the map image and illustrating the planned driving route, when it is estimated, on a basis of at least the forward visibility information, that visibility of a forward view from the own vehicle will be impaired. A situation in which a specific superimposition target to which the real-view following navigation image is associated is difficult to visually recognize due to the other vehicle is determined, and the bird's-eye-view navigation image is displayed, and thus the route guidance can be continued even when the visibility of the real-view following navigation image that is difficult to visually recognize is reduced or the real-view following navigation image is hidden. Further, even if the real-view following navigation image continues to be displayed, by checking it together with the bird's-eye-view navigation image, it is possible to easily grasp the sense of distance, or the like, of the real-view following navigation image.

Further, in a second embodiment which may be dependent on the first embodiment, the first display area is an area overlapping with the real view over the front windshield of the own vehicle, and the second display area is disposed below the first display area and is an area not overlapping with the real view over the front windshield. The first display area is an area in the front windshield through which visible light is transmitted and a real view can be visually recognized, and is, for example, within the display area of the head-up display device (image display unit). On the other hand, the second display area is an area not overlapping with the real view over the front windshield, and is, for example, an area overlapping with the shielding portion of the front windshield or the dashboard. In a broad sense, the second display area may be mostly within the area not overlapping with the real view over the front windshield, and a part (e.g., less than 30% of the second display area) may be outside the area not overlapping with the real view over the front windshield.

Further, in a third embodiment that may be dependent on the second embodiment, the second display area is within an area overlapping with a shielding portion of the front windshield, that shields a field of view from inside the vehicle. A second head-up display device (an example of the image display unit) can display a virtual image on the back side of the front windshield by projecting the light of the image displayed by the display to the shielding portion.

Further, in another embodiment which may be dependent on the second embodiment, the image display unit may be a display panel provided between the dashboard and the front windshield. The image display unit is a display panel provided on the dashboard on a side closer to the observer than the light transmission portion of the head-up display device.

Further, the image display unit is a display panel provided on the dashboard behind the light transmission portion of the head-up display device (at a position farther from the observer). When viewed from the center of the eye box of the head-up display device, the second display area in which the image display unit displays the bird's-eye-view navigation image is disposed in the area not overlapping with the real view over the front windshield.

Further, in a fourth embodiment which may be dependent on the first embodiment, the first display area is an area overlapping with the real view over the front windshield of the own vehicle, and the second display area is an area overlapping with the real view over the front windshield, and is disposed in such a manner that its upper end is above the lower end of the first display area.

Further, in a fifth embodiment which may be dependent on any one of the first to third embodiments, when it is estimated that visibility of a forward view from the own vehicle will be impaired, the processor further executes first movement processing of moving the real-view following navigation image in a first moving direction including at least a left or right direction in which the other vehicle is relatively moving and processing of hiding the real-view following navigation image during or before the first movement processing.

Further, in a fifth embodiment which may be dependent on the fourth embodiment, in the first movement processing, the processor changes a moving speed of the real-view following navigation image in a monotonically non-decreasing manner with respect to a relative moving speed of the other vehicle.

Further, in a sixth embodiment which may be dependent on the fifth embodiment, in the first movement processing, the processor sets a moving speed of the real-view following navigation image to be linear with respect to a relative moving speed of the other vehicle.

Further, in a seventh embodiment which may be dependent on the fifth embodiment, in the first movement processing, the processor sets a moving speed of the real-view following navigation image to be nonlinear with respect to a relative moving speed of the other vehicle.

Further, in an eighth embodiment which may be dependent on any one of the fourth to seventh embodiments, when it is estimated that visibility of a forward view from the own vehicle will be impaired, the processor further executes second movement processing of moving the bird's-eye-view navigation image to the second display area in a second moving direction including either the left or right direction included in the first moving direction, and visibility enhancing processing of enhancing the visibility of the bird's-eye-view navigation image in the middle of or in advance of the second movement processing.

Further, in a ninth embodiment which may be dependent on any one of the fourth to seventh embodiments, when it is estimated that visibility of a forward view from the own vehicle will be impaired, the processor further executes third movement processing of moving the bird's-eye-view navigation image to the second display area in a third moving direction including either the left or right direction not included in the first moving direction, and visibility enhancing processing of enhancing the visibility of the bird's-eye-view navigation image in the middle of or in advance of the third movement processing.

Further, in a tenth embodiment which may be dependent on any one of the fourth to seventh embodiments, when it is estimated that visibility of a forward view from the own vehicle will be impaired, the processor further executes fourth movement processing of moving the bird's-eye-view navigation image to the second display area in a fourth moving direction that does not include a left-right direction but includes either an upward or downward direction, and visibility enhancing processing of enhancing the visibility of the bird's-eye-view navigation image in the middle of or in advance of the fourth movement processing.

Further, in an eleventh embodiment which may be dependent on any one of the first to tenth embodiments, when it is estimated that visibility of a forward view from the own vehicle will not be impaired, the processor hides the bird's-eye-view navigation image and displays the real-view following navigation image in the first display area.

Further, in a twelfth embodiment which may be dependent on any one of the first to tenth embodiments, when it is estimated that visibility of a forward view from the own vehicle will not be impaired, the processor further executes fifth movement processing of moving the bird's-eye-view navigation image from the second display area and visibility reducing processing of reducing the visibility of the bird's-eye-view navigation image in the middle of or in advance of the fifth movement processing.

Further, in a thirteenth embodiment which may be dependent on any one of the first to twelfth embodiments, when it is estimated that visibility of a forward view from the own vehicle will not be impaired, the processor 33 further executes sixth movement processing of moving the real-view following navigation image in a second moving direction including at least a left or right direction in which the other vehicle is relatively moving and processing of enhancing the visibility of the real-view following navigation image during or before the sixth movement processing.

Further, in a fourteenth embodiment which may be dependent on any one of the eleventh to thirteenth embodiments, a second determination area is wider than a first determination area.

Further, in a display control device of a fifteenth embodiment which may be dependent on any one of the first to fourteenth embodiments, the processor determines the forward visibility state on the basis of the visibility information and the weather information, and decreases the luminance of the bird's-eye-view navigation image as the forward visibility state deteriorates. As the forward visibility state deteriorates, it becomes difficult to visually recognize the forward view. As a result, the visual attention of the observer is more likely to be directed to the image (bird's-eye-view navigation image) than to the forward view in which the visibility is relatively reduced, and thus the observer may feel annoyed by the image. According to the fifteenth embodiment, by decreasing the luminance of the bird's-eye-view navigation image as the forward visibility state deteriorates, it is possible to alleviate the visual attention of the observer being directed too much toward the image (bird's-eye-view navigation image).

In the display control device of the fifteenth embodiment, the processor determines a forward visibility state on a basis of the visibility information and the weather information, and when determining that the forward visibility state is a first forward visibility state, the processor displays the real-view following navigation image in the first display area, and when determining that the forward visibility state is a second forward visibility state where a forward view is more difficult to see than in the first forward visibility state, the processor displays the bird's-eye-view navigation image in the second display area at a first luminance, and when determining that the forward visibility state is a third forward visibility state where the forward view is more difficult to see than in the second forward visibility state, the processor displays the bird's-eye-view navigation image in the second display area at a second luminance lower than the first luminance.

In the display control device of the fifteenth embodiment, the processor may continuously lower the luminance of the bird's-eye-view navigation image in accordance with the degree of deterioration of the forward visibility state. The processor may digitize the degree of deterioration of the forward visibility state and linearly lower the luminance of the bird's-eye-view navigation image with respect to the numerical value of the degree of deterioration of the forward visibility state (however, the luminance may be nonlinearly changed). In another example, the processor may lower the luminance of the bird's-eye-view navigation image in stages in accordance with the degree of deterioration of the forward visibility state.

Further, in a display control device of a sixteenth embodiment which may be dependent on any one of the first to fifteenth embodiments, the processor determines a forward visibility state on a basis of the visibility information and the weather information, and when determining that the forward visibility state is a first forward visibility state, the processor displays the real-view following navigation image in the first display area, and when determining that the forward visibility state is a second forward visibility state where a forward view is more difficult to see than in the first forward visibility state, the processor displays the bird's-eye-view navigation image in the second display area at a first luminance, and when determining that the forward visibility state is a third forward visibility state where the forward view is more difficult to see than in the second forward visibility state, the processor displays the bird's-eye-view navigation image in the second display area at a second luminance lower than the first luminance, and when determining that the forward visibility state is a fourth forward visibility state where the forward view is more difficult to see than in the third forward visibility state, the processor displays the bird's-eye-view navigation image in a third display area having a vertical center disposed below the vertical center of the second display area. As the forward visibility state deteriorates, it becomes difficult to visually recognize the forward view. As a result, the visual attention of the observer is more likely to be directed to the image (bird's-eye-view navigation image) than to the forward view in which the visibility is relatively reduced, and thus the observer may feel annoyed by the image. According to the sixteenth embodiment, the area in which the bird's-eye-view navigation image is displayed is lowered downward as the forward visibility state deteriorates, whereby the image (bird's-eye-view navigation image) is less likely to enter the field of view of the observer facing forward (in other words, the observer moves away from the central field of view), and when the forward visibility state deteriorates, it is possible to reduce the tendency to look too closely at the image (bird's-eye-view navigation image).

Further, in a display control device of a seventeenth embodiment which may be dependent on any one of the first to sixteenth embodiments, the processor may adjust the ease of switching between various processing on the basis of operation information in the operation unit. The various processing include (1) processing of displaying the bird's-eye-view navigation image 220 in the second display area, (2) processing of hiding the bird's-eye-view navigation image, (3) processing of decreasing the luminance of the bird's-eye-view navigation image, (4) processing of increasing the luminance of the bird's-eye-view navigation image, and (5) processing of displaying the bird's-eye-view navigation image in the third display area. The ease of switching between various processes can be adjusted by relaxing and/or tightening the switching condition (parameter condition, time condition). According to the seventeenth embodiment, the user can appropriately adjust the switching condition.

Further, in a display control device of an eighteenth embodiment which may be dependent on any one of the first to seventeenth embodiments, the processor may switch between displaying and hiding the bird's-eye-view navigation image on the basis of operation information on the operation unit. The processor may automatically switch between displaying and hiding the real-view following navigation image in accordance with switching between displaying and hiding the bird's-eye-view navigation image. Specifically, the processor may automatically hide the real-view following navigation image when displaying the bird's-eye-view navigation image, and may automatically display the real-view following navigation image when hiding the bird's-eye-view navigation image.

Further, in a display control device of a nineteenth embodiment which may be dependent on any one of the first to eighteenth embodiments, the processor determines the forward visibility state on the basis of the visibility information and the weather information, displays the bird's-eye-view navigation image in the second display area at a first luminance when determining that the forward visibility state is the first forward visibility state, and hides the bird's-eye-view navigation image and displays the real-view following navigation image in the first display area when a fifth forward visibility state in which the forward view is more easily visible than in the first forward visibility state continues for a predetermined time or more.

Furthermore, a display system of a twentieth embodiment includes the display control device according to any one of the first to nineteenth embodiments and a head-up display device that displays a virtual image of a planned driving route in the first display area and the second display area.

BRIEF DESCRIPTION OF THE DRAWINGS

FIG. 1 is a diagram illustrating an application example of a vehicular display system to a vehicle, according to some embodiments.

FIG. 2 is a block diagram of the vehicular display system according to some embodiments.

FIG. 3 is a diagram illustrating an area of a map image around an own vehicle displayed as a bird's-eye-view navigation image, according to some embodiments.

FIG. 4 is a diagram conceptually illustrating a first determination area and a second determination area when a surface is viewed from the sky, according to some embodiments.

FIG. 5 is a diagram illustrating a display example of a real-view following navigation image in a first display mode in some embodiments.

FIG. 6A is a diagram illustrating a display example of a bird's-eye-view navigation image in a second display mode in some embodiments.

FIG. 6B is a diagram illustrating a display example of a bird's-eye-view navigation image in the second display mode in some embodiments.

FIG. 7 is a diagram illustrating a display example of the real-view following navigation image in switching from the first display mode to the second display mode in some embodiments.

FIG. 8 is a diagram illustrating a display example of the real-view following navigation image in switching from the first display mode to the second display mode in some embodiments.

FIG. 9 illustrates a disposition of a first display area and a second display area, according to some embodiments.

FIG. 10 is a diagram illustrating a disposition example of the second display area according to some embodiments.

FIG. 11A is a diagram illustrating a configuration of an image display unit in a display system according to some embodiments.

FIG. 11B is a diagram illustrating a configuration of the image display unit in the display system according to some embodiments.

FIG. 11C is a diagram illustrating a configuration of the image display unit in the display system according to some embodiments.

FIG. 12 is a diagram illustrating a disposition of a third display area according to some embodiments.

FIG. 13 is a diagram illustrating a disposition of the third display area are according to some embodiments.

MODE FOR CARRYING OUT THE INVENTION

A description of a configurations of an exemplary display system is provided below in FIGS. 1-13. The present invention is not limited to the embodiments below (including the contents of the drawings). It is of course possible to make changes (including deletion of components) to the embodiments below. Moreover, in the following descriptions, the descriptions of known technical matters will be omitted as appropriate to facilitate the understanding of the present invention.

Reference is made to FIG. 1. A vehicular display system 10 includes an image display unit 20, a display control device 30 that controls the image display unit 20, a locator 410, a global navigation satellite system (GNSS) device 411, an inertial measurement unit (IMU) 412, a map information storage device 420, a navigation device 430, a periphery monitoring sensor 440, a viewer detection device 450, an external communication connection device 460, a visibility detection unit 470, a weather database 480, a weather sensor 485, and an operation unit 490. It is assumed in the description of the present embodiment that the left-right direction when a driver 4 sitting on the driver's seat of an own vehicle 1 faces the front of the own vehicle 1 is the X-axis (the left direction is the X-axis positive direction), the up-down direction is the Y-axis (the up direction is the Y-axis positive direction), and the front-rear direction is the Z-axis (the front direction is the Z-axis positive direction).

The image display unit 20 of one embodiment in the vehicular display system 10 is a head-up display (HUD) device 20A provided in a dashboard 5 of the own vehicle 1. The HUD device 20A emits display light 20a toward a front windshield 2 (example of a projected member) through a light transmission portion 26, and allows an image to be visually recognized in a display area 110 on the front side (in the Z-axis positive direction) of the front windshield 2 (example of a projected member). When viewed from the inside of an eye box EB, the driver 4 can visually recognize the virtual image displayed by the HUD device 20A in the display area 110.

The "eye box" used in the description of the present embodiment is (1) an area in which the entire virtual image of the image can be visually recognized, and at least a part of the virtual image of the image cannot be visually recognized outside the area, (2) an area in which at least a part of the virtual image of the image can be visually recognized and a part of the virtual image of the image cannot be visually recognized outside the area, (3) an area in which at least a part of the virtual image of the image can be visually recognized at a predetermined luminance or higher and the entire virtual image of the image has a luminance lower than the predetermined luminance outside the area, or (4) an area in which at least a part of a virtual image can be stereoscopically viewed and a part of the virtual image is not stereoscopically viewed outside the area in a case where the HUD device 20A can display a stereoscopically viewable virtual image. That is, when the observer places the eyes (both eyes) outside the eye box EB, the observer cannot visually recognize the entire virtual image of the image, the visibility of the entire virtual image of the image is very low and it is difficult to perceive the image, or the virtual image of the image cannot be stereoscopically viewed. The predetermined luminance is, for example, approximately 1/50 with respect to the luminance of the virtual image of the image visually recognized at the center of the eye box. The "eye box" is set to be the same as the area (also called the eyelips) where the observer's viewpoint is expected to be located in the vehicle in which the HUD device 20A is installed, or to include a large portion of the eyelips (e.g., 80% or more).

The display area 110 is an area of a flat surface, a curved surface, or a partially curved surface on which the image generated in the HUD device is formed as a virtual image, and is also referred to as an image forming surface. The display area 110 itself is not actually visually recognized by the driver 4, or has low visibility to the extent that it is difficult to be visually recognized.

The image display unit 20 includes a display 22 having a display surface for displaying an image, and a relay optical system 24. The display 22 may be a transmissive display that transmits light from a back light such as a liquid crystal display (LCD), or may be a projection display that projects the image on a screen. In such cases, the display surface is the display surface of a transmissive display or a screen of a projection display.

The relay optical system 24 is disposed on the optical path of the light of the image from the display 22 between the display 22 and the front windshield 2, and is constituted by one or more optical members that project the light of the image from the display 22 onto the front windshield 2 outside the image display unit 20. The relay optical system 24 includes at least one concave mirror, but may additionally include, for example, one or more refractive optical members such as a lens, diffraction optical members such as hologram, and reflective optical members, or a combination thereof.

Further, the image display unit 20 may be a head-mounted display (hereinafter, referred to as an HMD) device 20B. The driver 4 wears the HMD device 20B on the head and sits on the seat in the own vehicle 1, thereby visually recognizing the displayed image superimposed on a real view 300 through the front windshield 2 of the own vehicle 1. The display area 110 in which the vehicular display system 10 displays a predetermined image is fixed (or adjustably arranged) at a specific position with reference to the coordinate system of the own vehicle 1, and by facing toward this direction, the driver 4 can visually recognize the image displayed in the display area 110 fixed at the specific position.

On the basis of the control of the display control device 30, the image display unit 20 can also display the image near a superimposition target such as an obstacle (a pedestrian, a bicycle, a motorcycle, an other vehicle, or the like), a driving lane 310 of the driving lane, a road sign, or a land object (a building or a bridge, or the like), that is present in the real view 300 which is the real space (real view) visually recognized through the front windshield 2 of the own vehicle 1 (an example of a specific positional relation between the image and the superimposition target), at a position overlapping with the superimposition target (an example of a specific positional relation between the image and the superimposition target, or at a position set on the basis of the superimposition target (an example of a specific positional relation between the image and the superimposition target). This also allows the observer (typically the driver 4 seated in the driver's seat of the own vehicle 1) to perceive visual augmented reality (AR). The image display unit 20 can display the image including an AR image whose display position changes in accordance with the position of the superimposition target and/or a non-AR image whose display position does not change in accordance with the position of the superimposition target.

FIG. 2 is a block diagram of the vehicular display system 10 according to some embodiments. The display control device 30 includes one or more input/output (I/O) interfaces 31, one or more processors 33, one or more image processing circuits 35, and one or more memories 37. The various functional blocks illustrated in FIG. 2 may be constituted by hardware, software, or a combination both. FIG. 2 is merely one mode of the embodiments, and the constituent components illustrated may be combined into fewer components, or additional components may be provided. For example, the image processing circuit 35 (e.g., a graphics processing unit) may be included in one or more processors 33.

As illustrated, the processor 33 and the image processing circuit 35 are operably connected to the memory 37. More specifically, the processor 33 and the image processing circuit 35 execute a program stored in the memory 37 so as to operate the vehicular display system 10, such as generating and/or transmitting image data. The processor 33 and/or the image processing circuit 35 may include at least one general-purpose microprocessor (e.g., a central processing unit (CPU)), at least one application specific integrated circuit (ASIC), at least one field programmable gate array (FPGA), or any combination thereof. The memory 37 includes any type of magnetic medium such as hard disk, any type of optical medium such as a compact disc (CD) or a digital versatile disc (DVD), any type of semiconductor memory such as a volatile memory, and a non-volatile memory. The volatile memory may include a dynamic random access memory (DRAM) and a static random access memory (SRAM), and the non-volatile memory may include a read-only memory (ROM) and a nonvolatile read-only memory (NVROM).

As illustrated, the processor 33 is operably connected to the I/O interface 31. The I/O interface 31 performs communication (also referred to as a controller area network (CAN) communication) with, for example, a vehicle electric control unit (ECU) 401, which will be described below, provided in the vehicle, and other electronic devices (indicated by reference numerals 401 to 420 described below) in accordance with the CAN standard. The communication standard adopted by the I/O interface 31 is not limited to CAN, and includes a wired communication interface such as a CAN with Flexible Data Rate (CANFD), a Local Interconnect Network (LIN), Ethernet (registered trademark), a Media Oriented Systems Transport (MOST) (MOST is a registered trademark), a Universal Asynchronous Receiver Transmitter (UART), or a Universal Serial Bus (USB), or an in-vehicle communication (internal communication) interface which is a near field wireless communication network within a range of several tens of meters, such as a personal area network (PAN) such as Bluetooth (registered trademark) or a local area network (LAN) such as 802.11x Wi-Fi (registered trademark) network. Moreover, the I/O interface 31 may include a vehicle exterior communication (external communication) interface such as a wide-area communication network (e.g., Internet communication network) according to a cellar communication standard, such as wireless wide area network (WAN0, IEEE802.16-2004 (WiMAX: Worldwide Interoperability for Microwave Access)), IEEE802.16e Base (Mobile WiMAX), 4G, 4G-LTE, LTE Advanced, and 5G.

As illustrated, the processor 33 is connected to the I/O interface 31 so as to be mutually operable and thus may transmit and receive information to and from various other electronic devices, and the like, connected to the vehicular display system 10 (the I/O interface 31). The I/O interface 31 is operably connected to, for example, a navigation device, a vehicle ECU, the external communication device, and the like provided in the own vehicle 1. The display 22 is operably connected to the processor 33 and the image processing circuit 35. Therefore, the image displayed by the image display unit 20 may be based on the image data received from the processor 33 and/or the image processing circuit 35. The processor 33 and the image processing circuit 35 control the image displayed by the image display unit 20 on the basis of the information acquired from the I/O interface 31. Furthermore, the I/O interface 31 may include a function to process (convert, calculate, and analyze) information received from another electronic device, or the like, connected to the vehicular display system 10.

The locator 410 illustrated in FIG. 2 is configured to mainly include a microcomputer including a processor, a RAM, a storage unit, an input/output interface, a bus connecting these components, and the like. The locator 410 combines the position information received by the GNSS device 411, the measurement result of the IMU 412, the vehicle speed information output to the I/O interface 31, and the like, and sequentially measures the own vehicle position, the traveling direction, and the like of the own vehicle 1. The locator 410 provides position information and direction information of the own vehicle 1 based on the positioning result to the display control device 30 and the like.

The GNSS device 411 illustrated in FIG. 2 receives a positioning signal transmitted from an artificial satellite (positioning satellite), detects the current position of the own vehicle, and outputs the detected position data to the locator 410. The GNSS device 411 can receive a positioning signal from each positioning satellite of at least one satellite positioning system among satellite positioning systems such as global positioning system (GPS), global navigation satellite system (GLONASS), Galileo, indian regional navigational satellite system (IRNSS), quasi-zenith satellite system (QZSS), and Beidou.

The IMU 412 is an Inertial Measurement Unit and includes, for example, a gyro sensor and an accelerometer to detect angular velocities in yaw, pitch, and roll directions and output the detected angular velocities to the locator 410. The locator 410 detects a change in the posture of the vehicle by detecting angular velocities in the yaw, pitch, and roll directions.

The map information storage device 420 is a storage medium that stores map data including the surroundings of the vehicle, and outputs the map data of the surroundings of the current position of the own vehicle to the display control device 30 on the basis of the position information and the direction information of the own vehicle 1 determined by the locator 410. Further, the map information storage device 420 outputs a relative position (distance and direction) of a superimposition target (a feature point such as a building or a branch point on a road) to the display control device 30 on the basis of the position information and the direction information of the own vehicle 1 determined by the locator 410. FIG. 1 illustrates an example in which the map information storage device 420 is externally attached to the display control device 30. However, the map information storage device 420 may be incorporated in the display control device 30. Further, the map information storage device 420 may be a server that distributes map information to the display control device 30 by communication from the outside of the own vehicle. The map information storage device 420 can acquire the latest map data from a server provided on a cloud.

The navigation device 430 is an in-vehicle device that performs route guidance to a destination set by the driver or the like. The navigation device 430 includes a map database (not illustrated) for navigation. The map database for navigation is mainly constituted by a non-volatile memory, and stores map data used for route guidance (hereinafter referred to as navigation map data). The navigation map data includes link data, node data, and the like for roads. The navigation device 430 provides navigation information indicating the contents of route guidance to the display control device 30. The navigation information includes, for example, position information and road shape information about an intersection or a junction, and direction information indicating a direction in which the vehicle should travel at the intersection or the junction.

The periphery monitoring sensor 440 detects a superimposition target existing in the periphery (front, side, and rear) of the vehicle 1. The superimposition target detected by the vehicle periphery monitoring sensor 440 may include, for example, an obstacle (pedestrian, bicycle, motorcycle, other vehicles, etc.), a road surface of a driving lane described below, a marking line, a roadside object, and/or a land object (building, etc.). The vehicle exterior sensor includes, for example, a detection unit including a radar sensor such as a millimeter-wave radar, an ultrasonic radar, or a laser radar, a camera, or any combination thereof, and processing device that processes detection data (fuses data) from the one or more detection units. For the object detection by the radar sensor or the camera sensor, a conventional well-known technique is applied. The object detection using these sensors may include detection of the presence or absence of the superimposition target in a three-dimensional space, and if the superimposition target is present, the position (a relative distance from the vehicle 1, the position in the left-right direction when the traveling direction of the vehicle 1 is the front-rear direction, the position in the up-down direction, etc), size (size in the horizontal direction (left-right direction), height direction (up-down direction), etc.), the moving direction (the horizontal direction (left-right direction), depth direction (front-rear direction)), the change velocity (horizontal direction ((left-right direction), depth direction (front-rear direction)), of the superimposition target and/or the type of the superimposition target. The one or the plurality of periphery monitoring sensors 440 can detect the superimposition target in front of the vehicle 1 for each detection cycle of each sensor and output, to the processor 33, superimposition target information (presence or absence of the superimposition target and information such as a position, a size, and/or a type of each superimposition target when the superimposition target is present) which is an example of the superimposition target information. The superimposition target information may be transmitted to the processor 33 via another device (e.g., the vehicle ECU 401). Further, when a camera is used as a sensor, an infrared camera or a near-infrared camera is desirable so that the superimposition target may be detected even when the surroundings are dark, such as at night. Furthermore, when a camera is used as a sensor, a stereo camera capable of acquiring a distance, and the like, by parallax is desirable.

The viewer detection device 450 includes a camera such as an infrared camera that detects the eye position of the observer sitting on the driver's seat of the vehicle 1 and may output a captured image to the processor 33. The processor 33 may acquire the captured image (an example of information from which the eye position can be estimated) from the viewer detection device 450, analyze the captured image using a technique such as pattern matching to detect the coordinates of the observer's eye position, and output a signal indicating the detected coordinates of the eye position to the processor 33.

Further, the viewer detection device 450 may output, to the processor 33, the analysis result obtained by analyzing the captured image of the camera (e.g., the signal indicating where the eye position 700 of the observer belongs in the spatial area corresponding to a plurality of preset display parameters). The method for acquiring the eye position of the observer of the vehicle 1 or the information from which the eye position of the observer may be estimated is not limited thereto, and it may be acquired using a known eye position detection (estimation) technique.

Furthermore, the viewer detection device 450 may detect the change velocity and/or the moving direction of the eye position of the observer and output the signal indicating the change velocity and/or the moving direction of the eye position of the observer to the processor 33.

The external communication connection device 460 is a communication device that exchanges information with the own vehicle 1, and is, for example, other vehicles connected to the own vehicle 1 by vehicle-to-vehicle communication (V2V: Vehicle To Vehicle), pedestrians (portable information terminals carried by pedestrians) connected by vehicle-to-pedestrian communication (V2P: Vehicle To Pedestrian), and network communication devices connected by vehicle-to-roadside infrastructure (V2I: Vehicle To roadside Infrastructure) and, in a broad sense, includes all devices connected by communications (V2X: Vehicle To Everything) with the own vehicle 1. The external communication connection device 460 may acquire, for example, the positions of a pedestrian, a bicycle, a motorcycle, an other vehicle (a preceding vehicle or the like), a road surface, a marking line, a roadside object, and/or a land object (a building or the like) and transmit them to the processor 33. Furthermore, the external communication connection device 460 may have the same function as that of the locator 410 described above, and transmit the position information and the direction information of the own vehicle 1 to the display control device 30 and may further have the function of the road information database 403 described above, acquire the road information (an example of the surrounding vehicle related information), and transmit same to the processor 33. The information acquired from the external communication connection device 460 is not limited to the above-described information.

The visibility detection unit 470 detects a visibility which is a distance that can be seen ahead of the vehicle 1, and outputs the visibility information to the display control device 30 (I/O interface 31). The visibility detection unit 470 calculates a visibility (a viewable distance) from a forward view image captured by a camera unit (not illustrated) provided in the vehicle 1 (note that a part or all of this function may be included in a visibility information processing module 508 described below).

The visibility detection unit 470 may output, to the display control device 30 (I/O interface 31), as visibility information, a determination result of whether the visibility is a long range (e.g., the visibility is 200 m or more and less than 300 m) (e.g., a first forward visibility state), a middle range (e.g., the visibility is 100 m or more and less than 200 m) (e.g., a second forward visibility state), or a short range (e.g., the visibility is less than 100 m) (e.g., a third forward visibility state) (note that a part or all of this function may be included in the visibility information processing module 508 described below).

The operation unit 490 is a hardware switch or the like provided in a steering wheel 6 or the like of the vehicle 1, and outputs a signal corresponding to an operation by an occupant (generally, the driver) of the vehicle 1 to the display control device 30 (I/O interface 31). The operation unit 490 may be a software switch displayed on a display (not illustrated) in the vehicle 1.

The software components stored in the memory 37 include a real-view following navigation image generation module 502, a bird's-eye-view navigation image generation module 504, a surrounding vehicle related information detection module 506, a visibility information processing module 508, a weather information processing module 510, a forward view visibility determination module 512, and an image switching module 514.

The real-view following navigation image generation module 502 controls the position, shape, and size of the real-view following navigation image 210 in such a manner that the real-view following navigation image is visually recognized in a desired positional relation with a specific superimposition target (e.g., a specific branch road, a specific position in a driving lane, a specific driving lane among a plurality of driving lanes, or the like) 310 of the real view 300. That is, the position and shape of the real-view following navigation image 210 are continuously updated at a predetermined cycle in accordance with the relative position and shape of the superimposition target 310. The real-view following navigation image generation module 502 disposes a virtual object for route guidance on a virtual road model around the own vehicle 1 (at least in the direction of the planned driving route) on the basis of the map data and the navigation information, and sets a virtual viewpoint position on the basis of the locator information (the position and angle of the own vehicle 1). Then, the real-view following navigation image generation module 502 displays the virtual object viewed from the virtual viewpoint position as the real-view following navigation image 210. In addition, the real-view following navigation image generation module 502 may adjust the position of the real-view following navigation image 210 on the basis of the position of the eyes of the driver 4 detected by the viewer detection device 450. For example, the real-view following navigation image generation module 502 determines the position of the real-view following navigation image 210 in the left-right direction and the up-down direction in such a manner that the center of the real-view following navigation image 210 is visually recognized to overlap with the center of the superimposition target 310. The "specific positional relation" can be adjusted depending on the situation of the superimposition target 310 or the own vehicle 1, the type of the superimposition target 310, the type of the image to be displayed, and the like. In addition, the real-view following navigation image generation module 502 may adjust the position of the real-view following navigation image 210 on the basis of a change in the vehicle posture detected by the IMU 412. Further, the real-view following navigation image generation module 502 may reduce the size of the real-view following navigation image 210 as the distance set for the real-view following navigation image 210 or the superimposition target 310 increases. The real-view following navigation image generation module 502 may be omitted, and the display control device 30 may acquire the image data of the real-view following navigation image 210 from the I/O interface 31.

The bird's-eye-view navigation image generation module 504 disposes a virtual object for route guidance on a virtual road model around the own vehicle 1 on the basis of the map data and the navigation information, and sets a virtual viewpoint position in the sky behind the own vehicle 1 on the basis of the locator information (the position and angle of the own vehicle 1). Then, the bird's-eye-view navigation image generation module 504 displays the virtual object viewed from the virtual viewpoint position as the bird's-eye-view navigation image 220. The bird's-eye-view navigation image generation module 504 may be omitted, and the display control device 30 may acquire the image data of the bird's-eye-view navigation image 220 from the navigation device 430 or the like via the I/O interface 31.

FIG. 3 illustrates an area of the map image around the own vehicle displayed as the bird's-eye-view navigation image 220. Here, it is assumed that the map is an $\alpha\gamma$ plane, and there is a virtual viewpoint position MM for displaying an overhead view at a position of a height $M\beta$ on a $\beta$ axis orthogonal to the $\alpha\gamma$ plane, that is, in the sky behind an own vehicle position icon PP. In the example of FIG. 3, the virtual viewpoint position MM is set at a position $M\gamma1$ behind ($\gamma$ negative direction) and $M\beta1$ above ($\beta$ positive direction) the own vehicle position icon PP, and the depression angle $\theta$ is set to $\theta1$. As illustrated in FIG. 3, the range of the map surrounded by a rectangular virtual field of view FGHJ at the look-down angle $\theta$ from the virtual viewpoint position MM can be expressed by a trapezoid surrounded by reference numerals F1'G1'H1'J1' having a wide range in the left-right direction ($\alpha$ direction) on the far side ($\gamma$ positive direction) and a narrow range in the left-right direction ($\alpha$ direction) on the near side ($\gamma$ negative direction). In some of the display modes of the present embodiment, the virtual field of view E has a narrower width in the left-right direction ($\alpha$ direction) in the area overlapping with the far side position in the map than the rectangular virtual field of view FGHJ. That is, the area of the map surrounded by the virtual field of view E (FKLJ) observed from the virtual viewpoint position MM is surrounded by reference numerals F1'K1'L1'J1' with the range in the left-right direction ($\alpha$ direction) thereof on the far side ($\gamma$ positive direction) narrower than that in the range surrounded by the reference numerals F1'G1'H1'J1'.

The bird's-eye-view navigation image generation module 504 sets the position Mβ (Mγ) and the angle θ of the virtual viewpoint position MM with respect to the map image. The bird's-eye-view navigation image generation module 504 changes the position Mβ (Mγ) and the angle θ of the virtual viewpoint to change the map image area around the own vehicle displayed as bird's-eye-view navigation image 220. Typically, the bird's-eye-view navigation image generation module 504 sets the position of the "virtual viewpoint" around the own vehicle (usually at an appropriate position behind the own vehicle). Further, the angle θ of the "virtual viewpoint" is an angle between the αγ plane and the direction passing from the virtual viewpoint position MM through a midpoint in the vertical direction of a virtual field of view K, which will be described below, and is hereinafter also referred to as a depression angle.

The bird's-eye-view navigation image generation module 504 sets the virtual viewpoint position MM at a position Mγ1 behind (γ negative direction) and Mβ1 above (β positive direction) the own vehicle position icon PP. Therefore, when the own vehicle is traveling straight on a straight traveling road, if the own vehicle position icon PP is viewed from the virtual viewpoint position MM, a bird's-eye view image in which the own vehicle position icon PP is traveling toward the front is obtained. As the virtual viewpoint position MM moves, the map image around the own vehicle is displayed in a rotated manner (with the angle changed). For example, when the own vehicle position icon PP is steered to rotate the own vehicle position icon PP by 90 degrees in the counterclockwise direction as viewed from directly above, the virtual viewpoint position MM is also rotated by 90 degrees in the counterclockwise direction in conjunction with the rotation of the own vehicle position icon PP.

When increasing the scale of the bird's-eye-view navigation image 220, the bird's-eye-view navigation image generation module 504 decreases the distance between the own vehicle position icon PP and the virtual viewpoint position MM. Specifically, in order to decrease the distance between the own vehicle position icon PP and the virtual viewpoint position MM, at least one of the distance Mγ in the front-rear direction (γ direction) and the distance Mβ in the up-down direction (β direction) is decreased. The bird's-eye-view navigation image generation module 504 may increase the scale of the bird's-eye-view navigation image 220 (may increase the scale in stages) as the distance to the route change point (e.g., a branch road) decreases.

The surrounding vehicle related information detection module 506 acquires information (also referred to as surrounding vehicle related information) related to a surrounding vehicle (also referred to as a cutting-in vehicle) W present in front of or beside the own vehicle 1, which is used by the forward view visibility determination module 512, which will be described below, to determine the visibility of a real view. The surrounding vehicle related information detection module 506 may acquire, for example, information indicating the position, the moving direction, or/and the moving speed of the surrounding vehicle W present in front of and/or beside the own vehicle 1 from the periphery monitoring sensor 440 and/or the external communication connection device 460. Further, the surrounding vehicle related information detection module 506 may acquire information indicating a turn signal, a steering angle of the surrounding vehicle W, and/or a planned traveling route and traveling schedule by the driving support system from the surrounding vehicle W via the external communication connection device 460.

The visibility information processing module 508 determines, on the basis of the visibility information (visibility) input from the visibility detection unit 470, whether the forward visibility state is a first forward visibility state (e.g., visibility of 200 m or more and less than 300 m), a second forward visibility state in which the visibility of the forward view is lower than that of the first forward visibility state (e.g., visibility of 100 m or more and less than 200 m), a third forward visibility state in which the visibility of the forward view is lower than that of the second forward visibility state (e.g., visibility of 50 m or more and less than 100 m), a fourth forward visibility state in which the visibility of the forward view is lower than that of the third forward visibility state (e.g., visibility of less than 50 m), or a fifth forward visibility state in which the visibility of the forward view is higher than that of the first forward visibility state (e.g., visibility of 300 m or more). That is, the visibility information processing module 508 may include table data for determining the forward visibility state on the basis of the visibility information (visibility).

Further, the visibility information processing module 508 may include some or all functions of the visibility detection unit 470. That is, the visibility information processing module 508 may calculate the visibility (viewable distance) on the basis of a forward view image captured by a camera unit (not illustrated) provided in the vehicle 1.

The weather information processing module 510 refers to the weather database 480 via the I/O interface 31, and acquires weather information indicating that the estimated weather around the own vehicle 1 is bad weather (e.g., fog, haze, rain, snow, and levels thereof). The visibility information processing module 508 may determine whether the forward visibility state is the first forward visibility state, the second forward visibility state, the third forward visibility state, or the fourth forward visibility state on the basis of the weather information (e.g., fog, haze, rain, snow, and levels thereof) input from the weather database 480. That is, the weather information processing module 510 may include table data or the like for determining a forward visibility state on the basis of the weather information (e.g., fog, haze, rain, snow, and levels thereof).

Further, the weather information processing module 510 may acquire weather information indicating that the weather estimated around the own vehicle 1 is bad weather (e.g., a level of rain) from the weather sensor 485 such as a rain sensor via the I/O interface 31, and may determine the forward visibility state in accordance with the level of rain.

The forward view visibility determination module 512 determines whether the surrounding vehicle W is present in front of the own vehicle 1 and is in a state of obstructing visual recognition of the real view on the basis of the position of the surrounding vehicle W present in front of and/or beside the own vehicle 1 acquired from the surrounding vehicle related information detection module 506. The forward view visibility determination module 512 determines that the visibility of the forward view is reduced when detecting that the position of the surrounding vehicle W enters a first determination area E1. Further, the forward view visibility determination module 512 determines that the visibility of the forward view is enhanced when detecting that the position of the surrounding vehicle W exits from a second determination area E2.

FIG. 4 is a diagram conceptually illustrating the first determination area and the second determination area when a road surface is viewed from the sky. The first determination area E1 is, for example, an area within the driving lane 310 of the own vehicle 1, and the second determination area E2 is an area wider than the first determination area E1 and is, for example, an area including the outside of a left marking line 312 and the outside of a right marking line 313 of the driving lane 310 of the own vehicle 1. By differentiating the range of the first determination area E1 for determining the entry and the range of the second determination area E2 for determining the exit, hysteresis control for preventing frequent switching of the entry/exit determination can be performed.

Further, the forward view visibility determination module 512 may calculate a possibility that the surrounding vehicle W will cut in the driving lane of the own vehicle 1 (also referred to as cut-in possibility) on the basis of the position, moving direction, and moving speed of the surrounding vehicle W present in front of and/or beside the own vehicle 1, the turn signal, steering angle of the surrounding vehicle W, and/or a planned traveling route and a traveling schedule by the driving support system, which are acquired from the surrounding vehicle related information detection module 506, and may determine that there is a high possibility of cutting in if the calculated cut-in possibility exceeds a predetermined threshold value previously stored in the memory 37 (or may predict that the vehicle will enter the first determination area E1 in front of the own vehicle 1). The forward view visibility determination module 512 may predict that the surrounding vehicle W (here, the vehicle W entering the first determination area E1) will exit from the first determination area E1 (or the second determination area E2) in front of the own vehicle 1, on the basis of the aforementioned surrounding vehicle related information of the surrounding vehicle W.

Further, the forward view visibility determination module 512 may estimate the position where the surrounding other vehicle W will cut into the driving lane 310 of the own vehicle 1 (also called the cut-in position), on the basis of the position, moving direction, and moving speed of the surrounding vehicle W present in front of and/or beside the own vehicle 1, the turn signal, steering angle of the surrounding other vehicle W, and/or a planned traveling route and a traveling schedule by the driving support system. For example, the forward view visibility determination module 512 may estimate a cut-in route of the surrounding other vehicle W and specify, as the cut-in position, the vicinity of an intersection between the cut-in route and the marking line 312 on the left side or the marking line 313 on the right side of the driving lane 310 in which the own vehicle 1 drives.

The forward view visibility determination module 512 does not need to have the function of calculating the cut-in possibility and/or the function of determining the cut-in possibility, and some or all of these functions may be provided separately from the display control device 30 of the vehicular display system 10, and may be provided in, for example, another ECU (not illustrated) in the own vehicle 1.

The image switching module 514 switches the display mode of the navigation image on the basis of the determination result of the forward view visibility determination module 512. Specifically, the image switching module 514 sets the display mode to a first display mode in which only the real-view following navigation image 210 is displayed when estimating that (1) the forward view from the own vehicle 1 will not be obstructed by the other vehicle W (e.g., when detecting that the other vehicle W has exited or is predicted to exit from a predetermined second determination area E2 ahead), and sets the display mode to a second display mode in which the bird's-eye-view navigation image 220 is displayed instead of (or in addition to) the real-view following navigation image 210 when estimating that (2) the forward view from the own vehicle 1 will be obstructed by the other vehicle W (e.g., when detecting that the other vehicle W has entered or is predicted to enter a predetermined first determination area E1 ahead.

FIG. 5 is a diagram illustrating a display example of the real-view following navigation image 210 in the first display mode. The real-view following navigation image 210 illustrated in FIG. 5 is an AR image that is superimposed on a driving lane 311 (an example of the specific superimposition target 310) that is an area between the left marking line 312 and the right marking line 313, extends from the near side to the far side along the road surface of the driving lane 311, and is bent in accordance with the position and shape of a branch point 315 (an example of the specific superimposition target 310). The real-view following navigation image 210 is displayed in a first display area 710 of a HUD display area 610. The center of the first display area 710 in the up-down direction (Y-axis direction) is denoted by a reference numeral 710A.

FIG. 6A is a diagram illustrating a display example of the bird's-eye-view navigation image 220 in the second display mode in some embodiments. When it is estimated that the forward view from the vehicle 1 will be obstructed by the other vehicle W, the image switching module 514 displays the bird's-eye-view navigation image 220 instead of the real-view following navigation image 210 (second display mode). That is, in some embodiments, in the second display mode, the image switching module 514 hides the real-view following navigation image 210. The bird's-eye-view navigation image 220 includes a map image 221 of the surroundings of the own vehicle 1, a route image 222 disposed on the map image 221, and an own vehicle position icon 223 (which may be omitted). The bird's-eye-view navigation image 220 is displayed in a second display area 721 (720) of the HUD display area 610. The center of the second display area 721 (720) in the up-down direction (Y-axis direction) is denoted by a reference numeral 721A (720A). A center 721A (720A) of the second display area 721 (720) in the up-down direction is disposed below a center 710A of the first display area 710 in the up-down direction. That is, the bird's-eye-view navigation image 220 is disposed below (in the Y-axis negative direction) the real-view following navigation image 210.

FIG. 6B is a diagram illustrating a display example of the bird's-eye-view navigation image 220 in the second display mode in some embodiments. When it is estimated that the forward view from the vehicle 1 will be obstructed by the other vehicle W, the image switching module 514 additionally displays the bird's-eye-view navigation image 220 in addition to the real-view following navigation image 210 (second display mode). That is, in some embodiments, in the second display mode, the image switching module 514 does not hide the real-view following navigation image 210. An upper part of the second display area 721 (720) in which the bird's-eye-view navigation image 220 is displayed may overlap with a lower part of the first display area 710 in which the real-view following navigation image 210 is displayed. In such a case, the image switching module 514 performs layer display in such a manner that the bird's-eye-view navigation image 220 is in the upper layer than the real-view following navigation image 210, as illustrated in FIG. 6B. Here, at least a part of the bird's-eye-view navigation image 220 which overlaps with the real-view following navigation image 210 may be semi-transparent. As a result, the bird's-eye-view navigation image 220 is recognized as being closer to the front than the real-view following navigation image 210, and the identifiability of information can be improved while both the real-view following navigation image 210 and the bird's-eye-view navigation image 220 are displayed.

FIG. 7 is a diagram illustrating a display example of the real-view following navigation image 210 in switching from the first display mode to the second display mode in some embodiments. When switching to the second display mode, the image switching module 514 sets the luminance of the real-view following navigation image 210 to be low and then hides the image. With this, it is possible to prevent the observer from being confused by sudden non-display of the real-view following navigation image 210. More specifically, when switching to the second display mode, the image switching module 514 may hide the real-view following navigation image 210 while gradually reducing the luminance of the real-view following navigation image 210. In a case where the real-view following navigation image 210 is not hidden in the second display mode, the image switching module 514 may display the bird's-eye-view navigation image 220 which is not low luminance and the real-view following navigation image 210 which is low luminance. This makes it possible to attract attention to the bird's-eye-view navigation image 220 while displaying the real-view following navigation image 210.

Further, conversely, when the display mode is switched from the second display mode to the first display mode, the image switching module 514 may gradually increase the luminance of the real-view following navigation image 210 from a low luminance (or hidden) state. Furthermore, when starting the display of the bird's-eye-view navigation image 220, the image switching module 514 may gradually increase the luminance from the hidden state, and conversely, when hiding the bird's-eye-view navigation image 220, the image switching module 514 may gradually decrease the luminance and then hide the bird's-eye-view navigation image 220.

FIG. 8 is a diagram illustrating a display example of the real-view following navigation image 210 in switching from the first display mode to the second display mode in some embodiments. When switching to the second display mode, the image switching module 514 moves the position of the real-view following navigation image 210. For example, when the other vehicle W enters the front of the own vehicle 1 from the right side, the image switching module 514 moves the position of the real-view following navigation image 210 to the left side (in a predetermined moving direction Mo). At this time, the image switching module 514 moves the real-view following navigation image 210 and gradually lowers the luminance to hide the image.

As described above, in the display system 10 of the first embodiment, in the display control device 30 that controls one or more image display units 20 that display an image illustrating a planned driving route, one or more processors 33 are included, and the one or more processors 33 acquire navigation information related to the planned driving route, display, in a first display area 710, with a use of at least the navigation information, a real-view following navigation image 210 that follows a specific superimposition target in a real view so as to maintain a positional relation with the specific superimposition target, acquire other vehicle information related to a position of an other vehicle W, and display, in a second display area 720 having a vertical center 720A disposed below a vertical center 710A of the first display area 710, a bird's-eye-view navigation image 220 that includes, in a diagonal view from above, at least a map image 221 of surroundings of an own vehicle and a route image 222 overlapping with the map image 221 and illustrating the planned driving route, when it is estimated, on the basis of at least the other vehicle information, that visibility of a forward view from the own vehicle will be impaired. A situation in which a specific superimposition target to which the real-view following navigation image 210 is associated is difficult to visually recognize due to the other vehicle W is determined, and the bird's-eye-view navigation image 220 is displayed, and thus the route guidance can be continued even when the visibility of the real-view following navigation image 210 that is difficult to visually recognize is reduced or the real-view following navigation image 210 is hidden. Further, even if the real-view following navigation image 210 continues to be displayed, by checking it together with the bird's-eye-view navigation image 220, it is possible to easily grasp the sense of distance, or the like, of the real-view following navigation image 210.

Further, in a display system 10 of a second embodiment which may be dependent on the first embodiment, the first display area 710 is an area overlapping with the real view over the front windshield 2 of the own vehicle 1, and the second display area 720 is disposed below the first display area 710 and is an area not overlapping with the real view over the front windshield. As illustrated in FIG. 9, the first display area 710 is an area 110 in the front windshield 2 through which visible light is transmitted and a real view can be visually recognized, and is, for example, within the display area 110 of the head-up display device 20A (image display unit 20). On the other hand, as illustrated in FIG. 9, the second display area 720 is an area 120 not overlapping with the real view over the front windshield 2, and is, for example, an area overlapping with the shielding portion 2C of the front windshield 2 or the dashboard 5. In a broad sense, the second display area 720 may be mostly within the area 120 not overlapping with the real view over the front windshield 2, and a part (e.g., less than 30% of the second display area 720) may be outside the area 120 not overlapping with the real view over the front windshield 2.

Further, in a display system 10 of a third embodiment that may be dependent on the second embodiment, as illustrated in FIG. 10, the second display area 720 is within the area 120 overlapping with the shielding portion 2C of the front windshield, that shields a field of view from inside the vehicle. As illustrated in FIG. 11A, a second head-up display device 20C (an example of the image display unit 20) can display a virtual image on the back side of the front windshield 2 by projecting the light of the image displayed by the display 22C to the shielding portion 2C.

Further, in a display system 10 of another embodiment which may be dependent on the second embodiment, the image display unit 20 may be a display panel provided between the dashboard 5 and the front windshield 2. An image display unit 20D in FIG. 11B is a display panel provided on the dashboard 5 on a side closer to the driver 4 than the light transmission portion 26 of the head-up display device 20A. When viewed from the center of the eye box EB of the head-up display device 20A, the second display area 720 in which the image display unit 20D of FIG. 11B displays the bird's-eye-view navigation image 220 is disposed in the area 120 not overlapping with the real view over the front windshield 2.

Further, as illustrated in FIG. 11C, an image display unit 20E is a display panel provided on the dashboard 5 behind the light transmission portion 26 of the head-up display device 20A (at a position farther from the driver 4). When viewed from the center of the eye box EB of the head-up display device 20A, the second display area 720 in which the image display unit 20D of FIG. 11C displays the bird's-eyeview navigation image 220 is disposed in the area 120 not overlapping with the real view over the front windshield 2.

Further, in a display system 10 of a fourth embodiment which may be dependent on the first embodiment, as illustrated in FIG. 6A and FIG. 6B, the first display area 710 is an area overlapping with the real view over the front windshield of the own vehicle, and the second display area 720 is an area overlapping with the real view over the front windshield and is disposed in such a manner that its upper end is above the lower end of the first display area 710.

Further, in a display system 10 of a fifth embodiment which may be dependent on any one of the first to third embodiments, when it is estimated that visibility of a forward view from the own vehicle will be impaired, the processor 33 further executes first movement processing of moving the real-view following navigation image 210 in a first moving direction including at least a left or right direction in which the other vehicle W is relatively moving and processing of hiding the real-view following navigation image 210 during or before the first movement processing.

Further, in a display system 10 of a fifth embodiment which may be dependent on the fourth embodiment, in the first movement processing, the processor changes the moving speed of the real-view following navigation image 210 in a monotonically non-decreasing manner with respect to a relative moving speed of the other vehicle W.

Further, in a display system 10 of a sixth embodiment which may be dependent on the fifth embodiment, in the first movement processing, the processor sets the moving speed of the real-view following navigation image 210 to be linear with respect to a relative moving speed of the other vehicle W.

Further, in a display system 10 of a seventh embodiment which may be dependent on the fifth embodiment, in the first movement processing, the processor sets the moving speed of the real-view following navigation image 210 to be nonlinear with respect to a relative moving speed of the other vehicle W.

Further, in a display system 10 of an eighth embodiment which may be dependent on any one of the fourth to seventh embodiments, when it is estimated that visibility of a forward view from the own vehicle will be impaired, the processor further executes second movement processing of moving the bird's-eye-view navigation image 220 to the second display area 720 in a second moving direction including either the left or right direction included in the first moving direction, and visibility enhancing processing of enhancing the visibility of the bird's-eye-view navigation image 220 in the middle of or in advance of the second movement processing.

Further, in a display system 10 of a ninth embodiment which may be dependent on any one of the fourth to seventh embodiments, when it is estimated that visibility of a forward view from the own vehicle will be impaired, the processor further executes third movement processing of moving the bird's-eye-view navigation image 220 to the second display area 720 in a third moving direction including either the left or right direction not included in the first moving direction, and visibility enhancing processing of enhancing the visibility of the bird's-eye-view navigation image 220 in the middle of or in advance of the third movement processing.

Further, in a display system 10 of a tenth embodiment which may be dependent on any one of the fourth to seventh embodiments, when it is estimated that visibility of a forward view from the own vehicle will be impaired, the processor further executes fourth movement processing of moving the bird's-eye-view navigation image 220 to the second display area 720 in a fourth moving direction that does not include a left-right direction but includes either an upward or downward direction, and visibility enhancing processing of enhancing the visibility of the bird's-eye-view navigation image 220 in the middle of or in advance of the fourth movement processing.

Further, in a display system 10 of an eleventh embodiment which may be dependent on any one of the first to tenth embodiments, when it is estimated that visibility of a forward view from the own vehicle will not be impaired, the processor hides the bird's-eye-view navigation image 220 and displays the real-view following navigation image 210 in the first display area 710.

Further, in a display system 10 of a twelfth embodiment which may be dependent on any one of the first to tenth embodiments, when it is estimated that visibility of a forward view from the own vehicle will not be impaired, the processor further executes fifth movement processing of moving the bird's-eye-view navigation image 220 from the second display area 720 and visibility reducing processing of reducing the visibility of the bird's-eye-view navigation image 220 in the middle of or in advance of the fifth movement processing.

Further, in a display system 10 of a thirteenth embodiment which may be dependent on any one of the first to twelfth embodiments, when it is estimated that visibility of a forward view from the own vehicle will not be impaired, the processor 33 further executes sixth movement processing of moving the real-view following navigation image 210 in a second moving direction including at least a left or right direction in which the other vehicle W is relatively moving and processing of enhancing the visibility of the real-view following navigation image 210 during or before the sixth movement processing.

Further, in a display system 10 of a fourteenth embodiment which may be dependent on any one of the eleventh to thirteenth embodiments, the second determination area E2 is wider than the first determination area E1.

Further, in a display control device 30 of a fifteenth embodiment which may be dependent on any one of the first to fourteenth embodiments, the processor 33 determines the forward visibility state on the basis of the visibility information and the weather information, and decreases the luminance of the bird's-eye-view navigation image 220 as the forward visibility state deteriorates. As the forward visibility state deteriorates, it becomes difficult to visually recognize the forward view. As a result, the visual attention of the observer is more likely to be directed to the image (bird's-eye-view navigation image) than to the forward view in which the visibility is relatively reduced, and thus the observer may feel annoyed by the image. According to the fifteenth embodiment, by decreasing the luminance of the bird's-eye-view navigation image as the forward visibility state deteriorates, it is possible to alleviate the visual attention of the observer being directed too much toward the image (bird's-eye-view navigation image).

In the display control device of the fifteenth embodiment, the processor 33 determines a forward visibility state on the basis of the visibility information and the weather information, and when determining that the forward visibility state is a first forward visibility state, the processor 33 displays the real-view following navigation image 210 in the first display area 710, and when determining that the forward visibility state is a second forward visibility state where a forward view is more difficult to see than in the first forward visibility state, the processor 33 displays the bird's-eye-view navigation image 220 in the second display area 720 at a first luminance, and when determining that the forward visibility state is a third forward visibility state where the forward view is more difficult to see than in the second forward visibility state, the processor 33 displays the bird's-eye-view navigation image 220 in the second display area 720 at a second luminance lower than the first luminance.

In the display control device 30 of the fifteenth embodiment, the processor 33 may continuously lower the luminance of the bird's-eye-view navigation image in accordance with the degree of deterioration of the forward visibility state. The processor 33 may digitize the degree of deterioration of the forward visibility state and linearly lower the luminance of the bird's-eye-view navigation image 220 with respect to the numerical value (level) of the degree of deterioration of the forward visibility state (however, the luminance may be nonlinearly changed). In another example, the processor may lower the luminance of the bird's-eye-view navigation image in stages in accordance with the degree of deterioration of the forward visibility state.

Further, in a display control device of a sixteenth embodiment which may be dependent on any one of the first to fifteenth embodiments, the processor 33 determines a forward visibility state on the basis of the visibility information and the weather information, and when determining that the forward visibility state is a first forward visibility state, the processor 33 displays the real-view following navigation image 210 in the first display area 710, and when determining that the forward visibility state is a second forward visibility state where a forward view is more difficult to see than in the first forward visibility state, the processor 33 displays the bird's-eye-view navigation image 220 in the second display area 720 at a first luminance, and when determining that the forward visibility state is a third forward visibility state where the forward view is more difficult to see than in the second forward visibility state, the processor 33 displays the bird's-eye-view navigation image 220 in the second display area 720 at a second luminance lower than the first luminance, and when determining that the forward visibility state is a fourth forward visibility state where the forward view is more difficult to see than in the third forward visibility state, the processor 33 displays the bird's-eye-view navigation image 220 in a third display area 730 having a vertical center 730A disposed below the vertical center 720A of the second display area 720. As the forward visibility state deteriorates, it becomes difficult to visually recognize the forward view. As a result, the visual attention of the observer is more likely to be directed to the image (bird's-eye-view navigation image) than to the forward view in which the visibility is relatively reduced, and thus the observer may feel annoyed by the image. According to the sixteenth embodiment, the area in which the bird's-eye-view navigation image 220 is displayed is lowered downward as the forward visibility state deteriorates, whereby the image (bird's-eye-view navigation image 220) is less likely to enter the field of view of the observer facing forward (in other words, the observer moves away from the central field of view), and when the forward visibility state deteriorates, it is possible to reduce the tendency to look too closely at the image (bird's-eye-view navigation image).

FIG. 12 is a diagram for explaining the third display area. In the sixteenth embodiment, the first display area 710 and the second display area 720 are disposed in the area 110 in which the real view can be visually recognized, and the third display area 730 may be disposed in the area 120 not overlapping with the real view and disposed below the area 110 in which the real view can be visually recognized.

FIG. 13 is a diagram for explaining the third display area. In the sixteenth embodiment (variation), the first display area 710, the second display area 720, and the third display area 730 may be disposed in the area 110 in which the real view can be visually recognized. The processor 33 reduces the size of the third display area 730, moves the position of the third display area 730 downward, or combines these to position the vertical center 730A of the third display area 730 lower than the vertical center 720A of the second display area 720.

Further, in a display control device 30 of a seventeenth embodiment which may be dependent on any one of the first to sixteenth embodiments, the processor 33 may adjust the ease of switching between various processes on the basis of operation information in the operation unit 490. The various processes include (1) processing of displaying the bird's-eye-view navigation image 220 in the second display area 720, (2) processing of hiding the bird's-eye-view navigation image 220, (3) processing of decreasing the luminance of the bird's-eye-view navigation image 220, (4) processing of increasing the luminance of the bird's-eye-view navigation image 220, and (5) processing of displaying the bird's-eye-view navigation image 220 in the third display area 730. The ease of switching between various processes can be adjusted by relaxing and/or tightening the switching condition (parameter condition, time condition). According to the seventeenth embodiment, the user can appropriately adjust the switching condition.

Further, in a display control device 30 of an eighteenth embodiment which may be dependent on any one of the first to seventeenth embodiments, the processor 33 may switch between displaying and hiding the bird's-eye-view navigation image 220 on the basis of operation information on the operation unit 490. The processor 33 may automatically switch between displaying and hiding the real-view following navigation image 210 in accordance with the switching between displaying and hiding the bird's-eye-view navigation image 220. Specifically, the processor 33 may automatically hide the real-view following navigation image 210 when displaying the bird's-eye-view navigation image 220, and may automatically display the real-view following navigation image 210 when hiding the bird's-eye-view navigation image 220.

Further, in a display control device 30 of a nineteenth embodiment which may be dependent on any one of the first to eighteenth embodiments, the processor 33 determines the forward visibility state on the basis of the visibility information and the weather information, displays the bird's-eye-view navigation image 220 in the second display area 720 at a first luminance when determining that the forward visibility state is the first forward visibility state, and hides the bird's-eye-view navigation image 220 and displays the real-view following navigation image 210 in the first display area when a fifth forward visibility state in which the forward view is more easily visible than in the first forward visibility state continues for a predetermined time or more.

Furthermore, a display system 10 of a twentieth embodiment includes the display control device 30 according to any one of the first to nineteenth embodiments and the head-up display device 20A that displays a virtual image of a planned driving route in the first display area 710 and the second display area 720.

DESCRIPTION OF REFERENCE NUMERALS 1 own vehicle
2 front windshield 2C shielding portion
4 driver
5 dashboard
6 road surface
10 vehicular display system
20 image display unit
20A HUD device
20B HMD device
20C second head-up display device
20D image display unit
20E image display unit
20a display light
22 display device
22C display
24 relay optical system
26 light transmission portion
30 display control device
31 I/O interface
33 processor
35 image processing circuit
37 memory
210 real-view following navigation image
220 bird's-eye-view navigation image
221 map image
222 route image
223 own vehicle position icon
300 real view
310 superimposition target
315 branch point
401 vehicle ECU
403 road information database
410 locator
411 GNSS device
420 map information storage device
430 navigation device
440 periphery monitoring sensor
450 viewer detection device
460 external communication connection device
502 real-view following navigation image generation module
504 bird's-eye-view navigation image generation module
506 surrounding vehicle related information detection module
508 visibility information processing module
510 weather information processing module
512 forward view visibility determination module
514 image switching module
610 HUD display area
700 eye position
710 first display area
720 second display area
730 third display area
EB eye box
Mo moving direction
W other vehicle

The invention claimed is:

1. A display control device that controls one or more image display units that display an image illustrating a planned driving route, wherein one or more processors:
acquire navigation information related to the planned driving route;
display, in a first display area, with a use of at least the navigation information, a real-view following navigation image that follows a specific superimposition target in a real view so as to maintain a positional relation with the specific superimposition target;
acquire, as forward visibility information, at least one of other vehicle information related to a position of an other vehicle, visibility information related to a distance that can be seen ahead, and weather information; and
display, in a second display area having a vertical center disposed below a vertical center of the first display area, a bird's-eye-view navigation image that includes, in a diagonal view from above, at least a map image of surroundings of an own vehicle and a route image overlapping with the map image and illustrating the planned driving route, when it is estimated, on a basis of at least the forward visibility information, that visibility of a forward view from the own vehicle will be impaired.

2. The display control device according to claim 1, wherein the first display area is an area overlapping with the real view over a front windshield of the own vehicle, and
wherein the second display area is disposed below the first display area and is an area not overlapping with the real view over the front windshield.

3. The display control device according to claim 2, wherein the second display area is an area overlapping with a shielding portion of the front windshield, that shields a field of view from inside the vehicle.

4. The display control device according to claim 1, wherein the first display area is an area overlapping with the real view over a front windshield of the own vehicle, and
wherein the second display area is an area overlapping with the real view over the front windshield, and is disposed in such a manner that an upper end thereof is higher than a lower end of the first display area.

5. The display control device according to claim 1, wherein when it is estimated that visibility of a forward view from the own vehicle will be impaired, the processor further executes first movement processing of moving the real-view following navigation image in a first moving direction including at least a left or right direction in which the other vehicle is relatively moving and processing of hiding the real-view following navigation image during or before the first movement processing.

6. The display control device according to claim 5, wherein, in the first movement processing, the processor changes a moving speed of the real-view following navigation image in a monotonically non-decreasing manner with respect to a relative moving speed of the other vehicle.

7. The display control device according to claim 6, wherein, in the first movement processing, the processor sets a moving speed of the real-view following navigation image to be linear with respect to a relative moving speed of the other vehicle.

8. The display control device according to claim 6, wherein, in the first movement processing, the processor sets a moving speed of the real-view following navigation image to be nonlinear with respect to a relative moving speed of the other vehicle.

9. The display control device according to claim 5, wherein when it is estimated that visibility of a forward view from the own vehicle will be impaired, the processor further executes second movement processing of moving the bird's-eye-view navigation image to the second display area in a second moving direction including either the left or right direction included in the first moving direction, and visibility enhancing processing of enhancing the visibility of the bird's-eye-view navigation image in the middle of or in advance of the second movement processing.

10. The display control device according to claim 5, wherein when it is estimated that visibility of a forward view from the own vehicle will be impaired, the processor further executes third movement processing of moving the bird's-eye-view navigation image to the second display area in a third moving direction including either the left or right direction not included in the first moving direction, and visibility enhancing processing of enhancing the visibility of the bird's-eye-view navigation image in the middle of or in advance of the third movement processing.

11. The display control device according to claim 5, wherein when it is estimated that visibility of a forward view from the own vehicle will be impaired, the processor further executes fourth movement processing of moving the bird's-eye-view navigation image to the second display area in a fourth moving direction that does not include a left-right direction but includes either an upward or downward direction, and visibility enhancing processing of enhancing the visibility of the bird's-eye-view navigation image in the middle of or in advance of the fourth movement processing.

12. The display control device according to claim 1, wherein when it is estimated that visibility of a forward view from the own vehicle will not be impaired, the processor further executes fifth movement processing of moving the bird's-eye-view navigation image from the second display area and visibility reducing processing of reducing the visibility of the bird's-eye-view navigation image in the middle of or in advance of the fifth movement processing.

13. The display control device according to claim 1,
wherein the processor determines a forward visibility state on a basis of the visibility information and the weather information, and when determining that the forward visibility state is a first forward visibility state, the processor displays the real-view following navigation image in the first display area,
wherein when determining that the forward visibility state is a second forward visibility state where a forward view is more difficult to see than in the first forward visibility state, the processor displays the bird's-eye-view navigation image in the second display area at a first luminance, and
wherein when determining that the forward visibility state is a third forward visibility state where the forward view is more difficult to see than in the second forward visibility state, the processor displays the bird's-eye-view navigation image in the second display area at a second luminance lower than the first luminance.

14. The display control device according to claim 1,
wherein the processor determines a forward visibility state on a basis of the visibility information and the weather information, and when determining that the forward visibility state is a first forward visibility state, the processor displays the real-view following navigation image in the first display area,
wherein when determining that the forward visibility state is a second forward visibility state where a forward view is more difficult to see than in the first forward visibility state, the processor displays the bird's-eye-view navigation image in the second display area at a first luminance,
wherein when determining that the forward visibility state is a third forward visibility state where the forward view is more difficult to see than in the second forward visibility state, the processor displays the bird's-eye-view navigation image in the second display area at a second luminance lower than the first luminance,
wherein when determining that the forward visibility state is a fourth forward visibility state where the forward view is more difficult to see than in the third forward visibility state, the processor displays the bird's-eye-view navigation image in a third display area having a vertical center disposed below the vertical center of the second display area.

15. A display system comprising:
the display control device according to claim 1; and
a head-up display device that displays a virtual image of the planned driving route in the first display area and the second display area.

16. A display control method that controls one or more image display units that display an image illustrating a planned driving route, the display control method comprising:
acquiring navigation information related to the planned driving route;
displaying, in a first display area, with a use of at least the navigation information, a real-view following navigation image that follows a specific superimposition target in a real view so as to maintain a positional relation with the specific superimposition target;
acquiring, as forward visibility information, at least one of other vehicle information related to a position of an other vehicle, visibility information related to a distance that can be seen ahead, and weather information; and
displaying, in a second display area having a vertical center disposed below a vertical center of the first display area, a bird's-eye-view navigation image that includes, in a diagonal view from above, a map image of surroundings of an own vehicle and an image overlapping with the map image and illustrating the planned driving route, when it is estimated or predicted, on a basis of at least the forward visibility information, that visibility of a forward view from the own vehicle will be impaired by the other vehicle.

* * * * *